US009624323B2

(12) United States Patent
Peterson et al.

(10) Patent No.: US 9,624,323 B2
(45) Date of Patent: Apr. 18, 2017

(54) PROPYLENE/BUTENE INTERPOLYMER PRODUCTION SYSTEM AND METHOD

(71) Applicant: W. R. Grace & Co.-Conn., Columbia, MD (US)

(72) Inventors: Sharon E. Peterson, St. Albans, WV (US); Mark W. Blood, Hurricane, WV (US); Theodore Duncan, Elkview, WV (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 14/774,487

(22) PCT Filed: Mar. 13, 2014

(86) PCT No.: PCT/US2014/025493
§ 371 (c)(1),
(2) Date: Sep. 10, 2015

(87) PCT Pub. No.: WO2014/159942
PCT Pub. Date: Oct. 2, 2014

(65) Prior Publication Data
US 2016/0032031 A1  Feb. 4, 2016

Related U.S. Application Data

(60) Provisional application No. 61/781,459, filed on Mar. 14, 2013.

(51) Int. Cl.
*C08F 210/06* (2006.01)
*C08F 2/34* (2006.01)
*B01J 8/24* (2006.01)

(52) U.S. Cl.
CPC .............. *C08F 210/06* (2013.01); *C08F 2/34* (2013.01)

(58) Field of Classification Search
CPC ....... C08F 2/34; C08F 210/06; C08F 2400/02
(Continued)

(56) References Cited

U.S. PATENT DOCUMENTS 5,539,076 A * 7/1996 Nowlin ............... B29C 47/0883
525/240
5,627,242 A   5/1997 Jacobsen et al.
(Continued)

FOREIGN PATENT DOCUMENTS

EP   0887359 A1   12/1998
EP   2046846 B1   5/2011
(Continued)

*Primary Examiner* — Fred M Teskin
(74) *Attorney, Agent, or Firm* — Lerner, David, Littenberg, Krumholz & Mentlik, LLP

(57) ABSTRACT

The present disclosure provides a process. In an embodiment, the process includes producing a propylene-based polymer in a gas-phase polymerization reactor (10) under polymerization conditions. The polymerization conditions include a combined propylene-plus-propane partial pressure from 290 psia to 450 psia. The process further includes maintaining the combined propylene-plus-propane partial pressure in the range from 290 psia to 450 psia while simultaneously: (i) reducing propylene partial pressure in the gas-phase polymerization reactor; (ii) adding propane to the gas-phase polymerization reactor; (iii) introducing at least one C4-C10 comonomer into the gas-phase polymerization reactor (26); and forming a propylene/C4-C10 interpolymer in the gas-phase polymerization reactor (44).

9 Claims, 1 Drawing Sheet

(58) Field of Classification Search
USPC .......................................... 526/73, 78, 916
See application file for complete search history.

(56) References Cited

U.S. PATENT DOCUMENTS

| | | | |
|---|---|---|---|
| 6,391,985 | B1 | 5/2002 | Goode et al. |
| 6,426,394 | B1* | 7/2002 | Erickson ................ C08F 10/06 502/152 |
| 2004/0072971 | A1 | 4/2004 | Govoni et al. |
| 2006/0287436 | A1 | 12/2006 | Pelliconi et al. |
| 2007/0270556 | A1 | 11/2007 | Mei et al. |
| 2008/0167512 | A1* | 7/2008 | Sanders ............... B01D 53/226 585/818 |
| 2010/0317908 | A1 | 12/2010 | McGlamery, Jr. et al. |
| 2011/0172377 | A1* | 7/2011 | Cai ....................... B01J 8/1809 526/88 |
| 2013/0090436 | A1 | 4/2013 | Balestra et al. |

FOREIGN PATENT DOCUMENTS

| | | |
|---|---|---|
| WO | 03054036 A1 | 7/2003 |
| WO | 2011160961 A1 | 12/2011 |

* cited by examiner

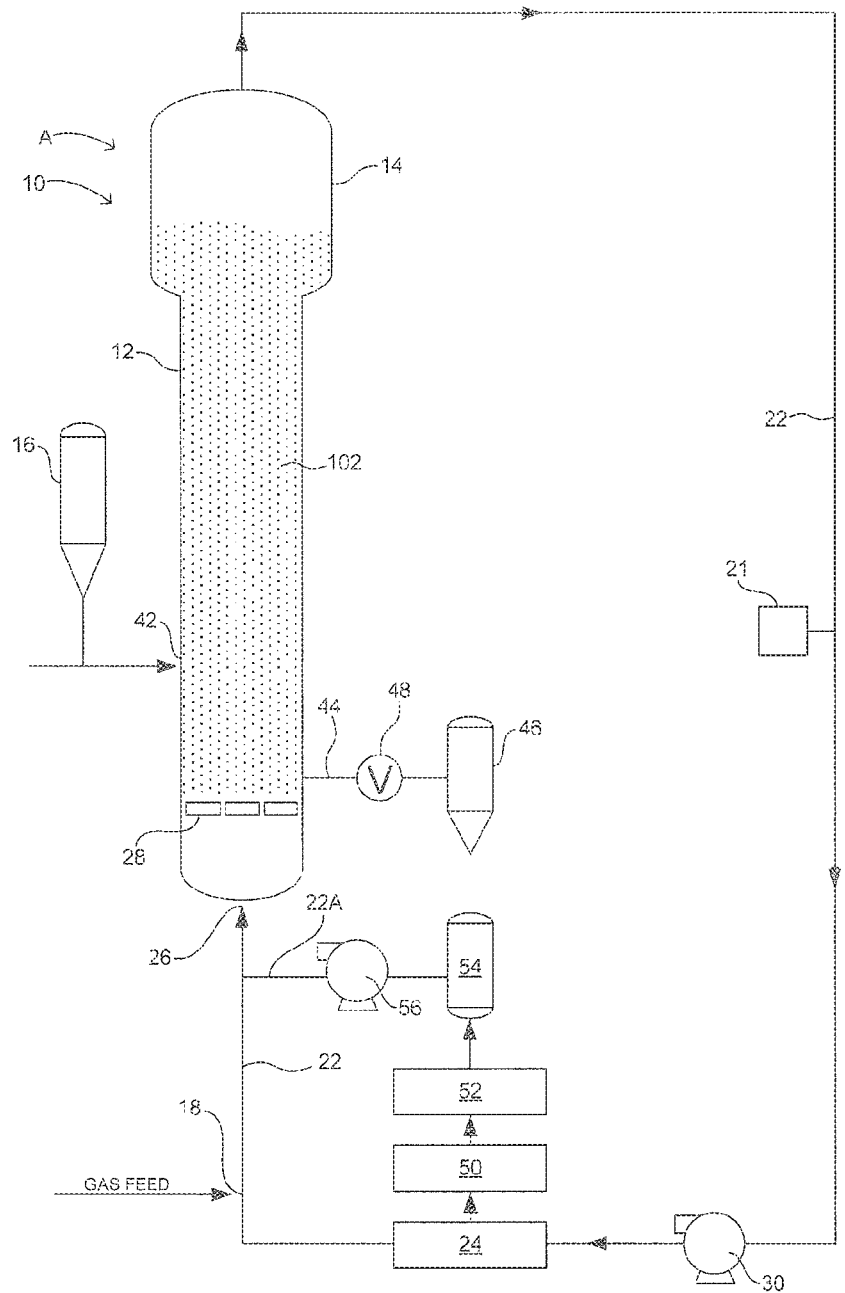

PROPYLENE/BUTENE INTERPOLYMER PRODUCTION SYSTEM AND METHOD

CROSS REFERENCE

The present application claims the benefit of the filing date of U.S. Provisional Application No. 61/781,459, filed Mar. 14, 2013, entitled Propylene/Butene Interpolymer Production System And Method, the disclosure of which is hereby incorporated herein by reference.

BACKGROUND

Market demand continues for new polypropylene products to meet ever-expanding applications. To meet demand, it is known that the selection of comonomer(s) for copolymerization with propylene allows for wide modification in resin properties such as hardness, tensile strength, stiffness, density, melting point, impact strength, etc.

In particular, propylene-based polymer which includes one, two, or more comonomers (such as ethylene and/or butene) and hereafter referred to as "propylene interpolymer" is finding increased commercial interest in applications such as films, packaging, and fibers. However, obstacles exist when producing propylene-based polymer with butene comonomer with conventional "commercial-scale" (40 kilotons annually (KTA) or larger or 5 metric tons/hr) gas-phase polymerization equipment.

In conventional commercial-scale gas-phase polymerization of propylene, propane naturally accumulates in the reactor system and synergistically functions as a condensing agent. When propylene-based polymer with one or more comonomer is produced, less propylene is fed to the gas-phase polymerization reactor when compared to propylene homopolymer production. As a result, the rate at which propane accumulates in the reactor system is slow, typically on the order of one or more days. In order to have somewhat equivalent gas density and cycle gas dew point needed to arrive at high production rate for propylene terpolymer, more propane must accumulate in the reactor than with propylene homopolymer production.

The slow naturally occurring build-up of propane in commercial-scale propylene interpolymer production where one or more comonomers are added to propylene has several drawbacks. With insufficient propane (i.e., insufficient condensing agent) in the reactor system, condensing mode operation cannot be achieved during the course of a normal run. Operating the gas-phase polymerization reactor in dry mode (no condensing mode) requires very low reaction temperature and results in prohibitively low production rates for commercial-scale.

Attempts have been made to add an inert component (often called "induced condensing agent" such as nitrogen or an alkane other than propane) on a continuous basis in order to adjust and maintain the partial pressures of the components in the reaction system to acceptable levels for commercial-scale propylene terpolymer production. Inert component addition adds to material costs and equipment costs, complicates reactor control, and achieves, at best, 60% of nameplate capacity. Inert component addition, therefore is not practical for the production of propylene terpolymer on conventional commercial-scale gas-phase polymerization reactors.

A need exists for a system and method to produce propylene-based polymer with one or more comonomers at nameplate rates in commercial-scale production using conventional gas-phase polymerization reactors. A need further exists for a system and method for reducing the transition time from commercial scale propylene homopolymer production to commercial-scale propylene interpolymer production.

SUMMARY

The present disclosure provides a process. In an embodiment, the process includes producing a propylene-based polymer in a gas-phase polymerization reactor under polymerization conditions. The polymerization conditions include a combined propylene-plus-propane partial pressure from 290 psia to 450 psia. The process further includes maintaining the combined propylene-plus-propane partial pressure in the range from 290 psia to 450 psia while simultaneously:

(i) reducing propylene partial pressure in the gas-phase polymerization reactor;

(ii) adding propane to the gas-phase polymerization reactor;

(iii) introducing at least one $C_4$-$C_{10}$ comonomer into the gas-phase polymerization reactor; and forming a propylene/$C_4$-$C_{10}$ interpolymer in the gas-phase polymerization reactor.

BRIEF DESCRIPTION OF THE DRAWINGS

The FIGURE is a schematic representation of a gas-phase polymerization system in accordance with an embodiment of the present disclosure.

DETAILED DESCRIPTION

The present process includes adding an initial dose of propane (or other similar inert) into the reaction system during transition, which may be done via externally sourced propane or propane collected from the polymerization process during production of a first polymer product. In both cases, the purpose of adding the propane is to modify the dewpoint of the mixture in the reaction system to allow condensation which, in turn, enhances removal of the heat of reaction. In the case where propane is collected from within the polymerization reactor system, the first polymerization is performed in a gas-phase polymerization reactor. The first polymerization includes the polymerization of propylene and optional comonomer. When the desired quantity of the first polymer product has been made, the conditions are changed to those necessary for producing the second product. The second polymerization includes the polymerization of propylene and comonomer(s) the sum of which contains less propylene. The present process includes introducing the propane into the reactor during transition from commercial-scale production of a first propylene-based polymer product (Product 1) to commercial-scale production of a different second product that is a propylene interpolymer (Product 2).

In an embodiment, the process includes producing a propylene-based polymer (or Product 1) in a gas-phase polymerization reactor under polymerization conditions. The combined propylene-plus-propane partial pressure in the reactor during steady-state Product 1 production is from 290 psia to 450 psia. The term "combined propylene plus-propylene partial pressure" is the sum of the propylene partial pressure and the propane partial pressure. The process includes transitioning to the production of a second polymer product, or propylene interpolymer (Product 2) in the same polymerization reactor. The process includes maintaining (during the transition phase) the combined propylene-plus-propane partial pressure in the range from 290 psia to 450 psia in the reactor while simultaneously:

(i) reducing the propylene partial pressure in the gas-phase polymerization reactor;

(ii) adding propane to the gas-phase polymerization reactor; and (iii) introducing at least one $C_4$-$C_{10}$ comonomer into the gas-phase polymerization reactor. The process further includes forming a propylene/$C_4$-$C_{10}$ interpolymer in the gas-phase polymerization reactor.

In an embodiment, the process includes maintaining the combined propylene-plus-propane partial pressure from 290 psia to 450 psia during the formation of the propylene/$C_4$-$C_{10}$ interpolymer.

In an embodiment, the process includes collecting propane during production of Product 1 and later adding the collected propane to the gas-phase polymerization reactor during the transition.

In an embodiment, the process includes forming propylene/$C_4$-$C_{10}$ interpolymer within 30 seconds to 48 hours after introducing the new comonomer.

In an embodiment, the process includes producing the propylene/$C_4$-$C_{10}$ interpolymer at greater than 60% of nameplate rate where nameplate is greater than 5 metric tons/hr. In a further embodiment, the process includes producing propylene interpolymer from 60% to at least 100% of nameplate rate within 1 hour to 20 hours of introduction of the $C_4$-$C_{10}$ comonomer into the reactor.

In an embodiment, the introducing step includes introducing butene comonomer into the gas-phase polymerization reactor to form propylene/butene copolymer.

In an embodiment, the introducing step includes introducing ethylene comonomer and butene comonomer in the gas-phase polymerization reactor to form propylene/ethylene/butene terpolymer.

In an embodiment, the producing step includes feeding propylene monomer and optionally ethylene comonomer into the gas-phase polymerization reactor to produce a Product 1, that is a propylene/ethylene copolymer.

In an embodiment, the process includes forming propylene/ethylene/butene terpolymer (hereafter P/E/B terpolymer) at 60% to at least 100% of nameplate rate within 1 hour to 20 hours from introducing the ethylene comonomer and the butene comonomer into the reactor.

The term "polymerization conditions" for commercial-scale gas-phase polymerization of propylene-based polymer includes, a reactor and reaction conditions (temperature, pressure, monomer, and catalyst) suitable to produce propylene-based polymer at 60% to at least 100% of nameplate rate.

In an embodiment, and with reference to the FIGURE, the present process embodies commercial-scale gas-phase polymerization (A) which includes a gas-phase polymerization reactor 10 having a reaction zone 12 and a velocity reduction zone 14. The reaction zone 12 includes a fluidized bed 102 of growing polymer particles, formed polymer particles, and a minor amount of catalyst particles fluidized by the continuous flow of polymerizable and modifying gaseous components in the form of make-up feed and recycle fluid through the reaction zone 12.

The gas-phase polymerization (A) also includes catalyst, propylene, optional comonomer(s), and other reactants which are fed continuously to the reaction zone 12, yielding a granular (powder) polymer product. The catalyst used in the fluidized bed can be fed into the reactor 10 in the form of solid particles, slurry, or liquid. For example, the solid catalyst may be stored in reservoir 16 under a blanket of inert gas and introduced into the reaction zone 12 at point 42. The polymer product is removed intermittently at point 44 and enters product discharge tank 46 through valve 48.

In an embodiment, the production of the first polymer product includes propylene and optionally a comonomer such as ethylene, the polymerization producing propylene homopolymer or propylene/α-olefin copolymer. In a further embodiment, the first polymerization excludes the comonomer butene and produces propylene homopolymer ("PP" or "Product 1").

During the first polymerization, propylene is fed into the reactor 10 to achieve a combined propylene-plus-propane partial pressure from 290 psia to 450 psia. At this level of propylene feed, the propane concentration builds to adequate levels in the first polymerization in a matter of hours. Adequate levels are defined as having a total partial pressure of propane, propylene, and other reactor gasses in the range of 290 psia to 450 psia. Therefore, the first polymerization generates propane in a sufficient amount such that the propane functions as a condensing agent. In other words, the first polymerization generates its own condensing agent—namely, the propane.

The portion of the fluidizing stream which does not react in the fluidized bed 102 constitutes the recycle stream which is removed from the polymerization zone, by passing it into velocity reduction zone 14 above the reaction zone 12, where entrained particles are given an opportunity to drop back into the dense fluidized bed.

Reactants in the vapor phase are continuously cycled from the reaction zone 12, through the velocity reduction zone 14, through a compressor 30 and a heat exchanger and back through the fluidized bed. The temperature of the fluidized bed 102 is controlled at an essentially constant temperature under steady state conditions by constantly removing the heat of reaction by way of the cycle gas flow. The cycle gas flow also serves to fluidize the reaction bed for good back mixing. The cycle gas flow also supplies the reactants to reaction sites.

Make-up fluid is fed to recycle line 22, for example, at point 18. The composition of the make-up stream (such as fresh monomer) is determined by gas analyzer 21. Gas analyzer 21 determines the composition of the recycle stream and the composition of the make-up stream is adjusted accordingly to maintain a steady-state gaseous composition within the reaction zone 12.

To ensure complete fluidization, the two-phase (propylene/propane) fluid recycle stream and, where desired, part of the make-up stream are returned through recycle line 22 to reactor 10 at point 26 below the fluidized bed 102. Gas distributor plate 28 is provided above point 26 to aid in fluidizing the fluidized bed 102. In passing through the fluidized bed 102, the two-phase fluid recycle stream absorbs the heat of reaction generated by the polymerization reaction. The absorption of reaction heat results in the temperature rise of the two-phase fluid recycle stream and the vaporization of the liquid portions of the two-phase fluid recycle stream.

The recycle stream is then compressed in compressor 30 and then passed through a heat exchange zone wherein the heat of reaction is removed before it is returned to the reaction zone 12.

In an embodiment, the present process includes collecting the propane from the first polymerization. Propane is naturally present in the propylene feedstock of the first polymerization. As the first polymerization progresses, the propane eventually builds to significant concentrations in the cycle gas so that propane functions as a condensing agent.

In an embodiment, the propane is collected by way of a vent recovery separator (VRS) 24, as shown in the FIGURE. The VRS 24 through a series of condensers and fractionating columns produces two liquid streams, one that is propylene rich and one that is propane rich. The propylene rich stream is recycled back to the reaction zone by way of recycle line 22.

The VRS 24 converts the recycle stream into a propylene stream and a propane stream as discussed above. The process includes contacting the propane rich stream with water to neutralize catalyst residual, passing the propane stream through a filter 50 to remove the solids produced in catalyst neutralization, then passing the propane stream from the VRS 24 through a dryer 52 which removes excess water from catalyst neutralization. From the dryer 52, the propane is fed into a propane storage tank 54. The vent recovery separator 24 recovers propylene while simultaneously allowing controlled removal of propane from the system. The VRS 24 maintains the dew point of the recycle stream at a temperature below the temperature of the fluidized bed 102. When propane is needed to charge the gas-phase polymerization (during transition, for example), a pump 56 discharges the propane into the reaction zone 12 through recycle line 22A. The propane, a component of the recycle stream, is then returned to reactor 10 at its base 26 and to fluidize the bed of polymer particles through gas distributor plate 28.

In an embodiment, the process includes transitioning from production of Product 1 to production of Product 2, in the gas-phase polymerization reactor 10. The second polymerization includes feeding propylene monomer and one or more $C_4$-$C_{10}$ comonomer(s) into the reaction zone 12, resulting in the polymerization of propylene and the $C_4$-$C_{10}$ comonomer(s). In a further embodiment, the second polymerization includes feeding propylene monomer, ethylene comonomer, and butene comonomer into the reaction zone 12, resulting in the polymerization of propylene, ethylene, and butene.

In an embodiment, the process includes terminating the first polymerization; i.e., termination of the gas-phase polymerization described above prior to the transition. The gas-phase termination can be accomplished by terminating the catalyst feed to the reactor via line 42 and letting the reaction die off in a controlled manner. Alternately, the reaction can be terminated rapidly terminating the catalyst flow through line 42 and adding a kill agent to the reactor to inactivate the catalyst in the reaction zone 12.

During transition, the process includes maintaining the combined propylene-plus-propane partial pressure in the gas-phase polymerization reactor 10 in the range from 290 psia to 450 psia while simultaneously:

(i) reducing the propylene partial pressure in reactor 10;
(ii) adding propane to reactor 10; and
(iii) introducing at least one $C_4$-$C_{10}$ comonomer into the reactor 10.

The term "simultaneously" refers to the temporal relationship between (A) the maintaining step (maintaining the combined propylene-plus-propane from 290 psia to 450 psia) and (B) steps (i) reducing propylene partial pressure, (ii) adding propane, and (iii) introducing $C_4$-$C_{10}$ comonomer above. Step (A) is performed while (B) is performed. In other words, step (A) is performed while the sub-steps of (B), (i), (ii), and (iii) are performed, regardless of the order or sequence of (i), (ii), and (iii).

In an embodiment, the maintaining step (A) is performed while simultaneously performing (B) sequentially: step (i), then step (ii), and then step (iii).

In an embodiment, (A) the maintaining step is performed while (B) steps (i), (ii), and (iii) are performed concurrently, or substantially concurrently.

In an embodiment, the present process includes adding propane into the gas-phase polymerization (A) during the transition. In an embodiment, the process includes feeding the propane stored in storage tank 54 (i.e., the propane collected from the first polymerization) into the reaction zone 12 by way of recycle line 22A.

The process includes forming a propylene/$C_4$-$C_{10}$ interpolymer. In conventional commercial-scale systems, the time required to build the increased level of propane in the reactor during transition from commercial-scale propylene-based polymer production to commercial-scale propylene/$C_4$-$C_{10}$ interpolymer production can be on the order of several days. The slow propane build-up prohibits the use of condensing mode operation until the concentration of propane increases to operational levels. The term "operational levels" is defined as the combined propylene-plus-propane partial pressure in the range of 290-450 psia. Start-up time of days or more before the reactor can run at full nameplate rates is impractical for commercial-scale gas-phase polymerization operations.

The addition of propane with simultaneous reduction of propylene partial pressure and simultaneous introduction of $C_4$-$C_{10}$ comonomer advantageously provides a natural condensing agent (propane) into the reactor system immediately, or substantially immediately. Addition of the propane enables condensing mode operation of the gas-phase polymerization reactor 10 within 1 hour to 20 hours of introduction of the $C_4$-$C_{10}$ comonomer. This leads to commercial-scale production levels of propylene/$C_4$-$C_{10}$ interpolymer within 1 hour to 20 hours of introduction of the $C_4$-$C_{10}$ comonomer into the reactor.

The present process includes introducing butene into the reactor during transition and forming a propylene/butene copolymer. In an embodiment, the propylene/butene copolymer has a density of 0.905 g/cc, 14.5 wt % butene, and has a melt flow rate (MFR) from 2.7 g/10 min to 4.1 g/10 min.

In an embodiment, the process includes introducing propylene, ethylene, and butene into the reactor and forming a propylene/ethylene/butene terpolymer. In a further embodiment, the present process includes forming the propylene/ethylene/butene terpolymer at a rate from 60% to at least 100% of nameplate, within 1 hour to 20 hours of the introduction of the $C_4$-$C_{10}$ comonomers into the reactor.

In an embodiment, the process includes producing (i) the propylene-based polymer (Product 1) at 60% to at least 100% of nameplate rate and (ii) producing the propylene/$C_4$-$C_{10}$ copolymer (Product 2) at 60% to at least 100% of nameplate rate, where the nameplate rate is 5 metric tons/hour. In a further embodiment, the process includes producing propylene/butene copolymer or propylene/ethylene/butene terpolymer at 60% to at least 100% of nameplate rate within 1 hour to 20 hours from introduction of the respective comonomers (butene alone or with ethylene) into the reactor.

The present process may comprise a combination of two or more embodiments disclosed herein.

DEFINITIONS

Unless stated to the contrary, implicit from the context, or customary in the art, all parts and percentages are by weight. For purposes of United States patent practice, the contents of any referenced patent, patent application or publication are incorporated by reference in their entirety (or its equivalent U.S. version is so incorporated by reference) especially with respect to the disclosure of synthetic techniques, definitions (to the extent not inconsistent with any definitions specifically provided in this disclosure), and general knowledge in the art.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "nameplate rate," as used herein, is defined as the production rate for which the production unit has been designed. This is typically stated on an annual basis (i.e., 400 KTA based on 8000 hours/year) or on an hourly basis (i.e., 5 metric tons/hr). Equipment, piping, etc. are all sized to accommodate the defined nameplate production rate. Units designed to a specific nameplate rate can usually be operated above and below that nameplate rate. Nameplate rate for a polymer plant is likely to be an average rate as different products (or families of products) have different design limitations (i.e., random copolymers generate more heat when produced and therefore require more cooling than homopolymers). In order not to build in excess capacity, the equipment is designed for the average rate needed across a range of products with the understanding that some products will be rate-limited (such as the random copolymers mentioned). The range of commercial nameplate rates start at 40 KTA and exceeds 650 KTA on an 8000 hour/year operating basis.

Melt flow rate (MFR) is determined in accordance with ASTM D 1238 test method at 230° C. with a 2.16 kg weight for propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which refers to polymers prepared from two different types of monomers or comonomers), terpolymers (which refers to polymers prepared from three different types of monomers or comonomers), tetrapolymers (which refers to polymers prepared from four different types of monomers or comonomers), and the like.

The term, "propylene-based polymer," as used herein, refers to a polymer that comprises a majority weight percent polymerized propylene monomer (based on the total amount of polymerizable monomers), and optionally may comprise at least one polymerized comonomer.

The term "propylene interpolymer," as used herein, is a propylene-based polymer and comprises propylene and one or more polymerized comonomers. The term "propylene copolymer," as used herein, is a propylene-based polymer and comprises propylene and one polymerized comonomer. The term "propylene terpolymer," as used herein, is a propylene-based polymer and comprises propylene and two or more polymerized comonomers.

The following examples are provided as specific illustrations of embodiments of the claimed invention. It should be understood, however, that the invention is not limited to the specific details set forth in the examples. Furthermore, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Additionally, a range of values represented by two endpoints will be understood to include the endpoint values unless the context of the disclosure clearly suggests otherwise.

Some embodiments of the present disclosure will now be described in detail in the following Examples.

EXAMPLES

Propylene homopolymer (PP or Product 1) is produced in a 300 KTA gas-phase polymerization reactor (8000 hr/yr basis, 37.5 metric tons/hr). The steady-state polymerization conditions for Product 1 production are provided in Table 1, column A below.

The present process is shown when comparing Column A to Column B and Column C, nameplate rate is 37.5 metric tons/hr. The production of Product 1 is subject to transition. A "transition" is defined as the act of changing polymerization reactions conditions for Product 1 to different reaction conditions in order to produce a different product, Product 2, in the same polymerization reactor. In the present example, Product 1 is propylene homopolymer and Product 2 is propylene/ethylene/butene terpolymer. Reaction conditions include temperature, pressure, and quantities of all materials (reactant, catalyst, cocatalyst, and otherwise) in the reaction system. The reaction system may or may not be producing polymer during a transition. The production rate can also vary during transition, if polymer is being produced during the transition.

An important aspect of the transition is the time it takes to change the composition of the materials in the reaction system. Conventional commercial-scale gas-phase polymerization reactors experience an inadequate amount of propane (or other dewpoint-modifying material) during transition to nameplate production of Product 2. Applicants discovered that the addition of propane—and a single initial dose-in of propane in particular—during the transition dramatically reduces the time it takes to achieve aim-grade and nameplate production of Product 2.

Compare Table 1 Column B (no propane dose during transition) to Table 1 Column C (propane dose during transition).

Column B represents transition to Product 2 from Product 1 without propane addition. Column C represents transition to Product 2 from Product 1 with propane dose during transition. The propane added during the transition shown in Column C is collected during production of Product 1 under Column A.

The transition identified in column C (with propane dose) achieves greater than 60% nameplate production of Product 2 in 10 hours. The transition in column B (without propane dose) requires 170 hours (7 days) to achieve only 42% nameplate production of Product 2. Applicants discovered that addition of propane into the reactor during transition achieves greater than 60% of nameplate production of Product 2 within hours as opposed to days with no propane addition (Column B).

Applicants achieved this dramatic reduction in transition time by performing the following procedures (commercial-scale polymerization of Product 1 is at steady-state):

1. reduce the propylene partial pressure in Product 1 production;
2. add propane to the gas-phase polymerization reactor;
3. introduce ethylene monomer and butene monomer; and
4. The above steps 1-3 are performed such that the combined propylene-plus-propane pressure in the gas-phase polymerization reactor is maintained in the range from 290 psia to 450 psia during transition. In other words, steps 1-3 above are performed while the combined propylene-plus-propane partial pressure in the gas phase polymerization reactor is maintained at 290 psia to 450 psia.

TABLE 1

|  | A<br>Product 1<br>(aim-grade<br>reaction<br>conditions) | B<br>Product 2<br>(aim grade<br>reaction<br>conditions<br>without<br>initial dosing) | C<br>Product 2<br>(aim grade<br>reaction<br>conditions<br>with initial<br>dosing) |
|---|---|---|---|
| Polymer type | PP homo-polymer | P/E/B Terpolymer | P/E/B Terpolymer |
| RESIN COMPOSITION (Wt. %) |  |  |  |
| Ethylene | — | 2% | 2% |
| Propylene | 100% | 84% | 84% |
| 1-Butene | — | 15% | 15% |
| Hydrogen | 0.002% | 0.003% | 0.001% |
| Production rate, Metric Tons/hr (Nameplate = 37.5 Metric Ton/hr) | 37.50 | 21.77 | 37.50 |
| Total Reactor Pressure, kg/cm$^2$a (psia) | 34.0 (484) | 31.6 (450) | 29.9 (425) |
| Propylene Partial Pressure, kg/cm$^2$a (psia) | 27.4 (390) | 7.7 (110) | 7.7 (110) |
| Propane Partial Pressure, kg/cm$^2$a (psia) | 3.8 (54) | 3.4 (49) | 10.5 (190) |
| Sum of Propylene & Propane Partial Pressure, kg/cm$^2$a (psia) | 31.2 (444) | 11.1 (159) | 18.2 (300) |
| Ethylene Partial Pressure, kg/cm$^2$a (psia) | 0.0 (0) | 0.1 (2) | 0.1 (2) |
| Butene Partial Pressure, kg/cm$^2$a (psia) | 0.0 (0) | 1.8 (26) | 1.8 (26) |
| Hydrogen Partial Pressure, kg/cm$^2$a (psia) | 0.1 (2) | 0.5 (7) | 0.5 (7) |
| Nitrogen & Ethane Partial Pressure, kg/cm$^2$a (psia) | 2.7 (38) | 17.6 (250) | 6.1 (87) |
| Transition time needed to reach Product 2 aim-grade conditions, Hr | — | 10 | 10 |
| Transition time needed to reach aim-grade conditions AND nameplate rates, Hr | — | 170 | 10 |

1. Main catalyst is SHAC catalyst
2. Catalyst 1: is Co-catalyst (Teal)
3. Catalyst 2: is Total SCA
4. Additives: Used for Post Reactor Finishing, including peroxide if applicable.

The present process differs from the conventional commercial-scale transition protocols which rely on continuous feed of an induced condensing agent during and throughout the production of Product 2. Advantageously, the present process requires only a single initial dose of propane to "kick-start" nameplate production of Product 2 and reduces transition time 10-fold to 20-fold when compared to conventional commercial-scale systems.

The present process advantageously reduces reactor downtime, increases production efficiencies. The present process expands the versatility and adaptability of conventional commercial-scale gas-phase polymerization reactors by enabling many different types of olefin interpolymers to be produced in a cost-effective and industrial scale.

As a result of the propane addition, the transition time to reach aim-grade conditions, the term "aim grade" is defined as polymer that meets the specifications required for market acceptance. Aim-grade conditions are those reaction conditions (including reaction temperature, pressure, reactant compositions in the reaction systems, and the like) required to produce polymer meeting aim-grade specifications and nameplate production rate is 10 hours (Column C). In contrast, without propane addition transition time to aim-grade conditions and nameplate production is 170 hours (Column B). The addition of propane during transition yields greater than a 10-fold reduction in transition time between Product 1 and Product 2 at greater than 60% of nameplate production (for Product 1 and Product 2). This is surprising and unexpected.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A process comprising:
   (A) producing a propylene-based polymer in a gas-phase polymerization reactor under polymerization conditions comprising a combined propylene-plus-propane partial pressure from 290 psia to 450 psia;
   (B) maintaining the combined propylene-plus-propane partial pressure in the range from 290 psia to 450 psia while simultaneously:
      (i) reducing propylene partial pressure in the gas-phase polymerization reactor;
      (ii) adding propane to the gas-phase polymerization reactor;
      (iii) introducing at least one $C_4$-$C_{10}$ comonomer into the gas-phase polymerization reactor; and
   (C) forming a propylene/$C_4$-$C_{10}$ interpolymer in the gas-phase polymerization reactor.

2. The process of claim 1 comprising maintaining the combined propylene-plus-propane partial pressure from 290 psia to 450 psia during the forming of the propylene/$C_4$-$C_{10}$ interpolymer.

3. The process of claim 1 comprising collecting propane during the producing step and adding the collected propane to the gas-phase polymerization reactor during the adding step (ii).

4. The process of claim 1 comprising performing the forming step within 30 seconds to 48 hours after reducing the propylene partial pressure.

5. The process of claim 1, comprising producing the propylene-based polymer at a rate from 60% to at least 100% of nameplate rate.

6. The process of claim 1 comprising producing the propylene/$C_4$-$C_{10}$ interpolymer at greater than 60% of nameplate rate.

7. The process of claim 1 wherein the introducing step comprises introducing butene comonomer into the gas-phase polymerization reactor and forming a propylene/butene copolymer.

8. The process of claim 1 wherein the introducing step comprises introducing ethylene comonomer and butene comonomer in the gas-phase polymerization reactor and forming a propylene/ethylene/butene terpolymer.

9. The process of claim 8 comprising forming propylene/ethylene/butene terpolymer at a rate from 60% to at least 100% of nameplate within 1 hour to 20 hours from performance of the introducing step.

* * * * *